No. 852,965. PATENTED MAY 7, 1907.
J. KOELNER.
APPARATUS FOR MIXING AND KNEADING DOUGH.
APPLICATION FILED OCT. 5, 1906.

WITNESSES:
O. R. Erwin
A. M. Schulz

INVENTOR
John Koelner
BY
Erwin & Whelen
ATTORNEYS.

THE NORRIS PETERS CO., WASHINGTON, D. C.

UNITED STATES PATENT OFFICE.

JOHN KOELNER, OF MILWAUKEE, WISCONSIN.

APPARATUS FOR MIXING AND KNEADING DOUGH.

No. 852,965.     Specification of Letters Patent.     Patented May 7, 1907.

Application filed October 5, 1906. Serial No. 337,531.

*To all whom it may concern:*

Be it known that I, JOHN KOELNER, a citizen of the United States, residing at Milwaukee, county of Milwaukee, and State of Wisconsin, have invented new and useful Improvements in Apparatus for Mixing and Kneading Dough, of which the following is a specification.

My invention relates to certain improvements in an apparatus for mixing and kneading dough for which Letters Patent of the United States, No. 789,614, was issued to me on the 9th day of May, 1905.

The invention shown in said patent comprises among other things a dough mixing receptacle provided with a water compartment and spiral mixing blade, an operating crank and handle, an operating shaft communicating from said crank to said mixing blade, a supporting base, and means for rigidly securing said receptacle in an angular position to said supporting base as the same is being operated.

By my present improvements I have dispensed with the supporting base and water compartment and substituted therefor the inclosing water tank, which, when supplied with water, not only serves as a means for supporting the mixing receptacle but also as a means of supplying the required quantity of water for maintaining the contents of the receptacle at the desired temperature, whereby the supporting base and water compartment heretofore formed as an integral part of the mixing receptacle is dispensed with.

Figure 1:
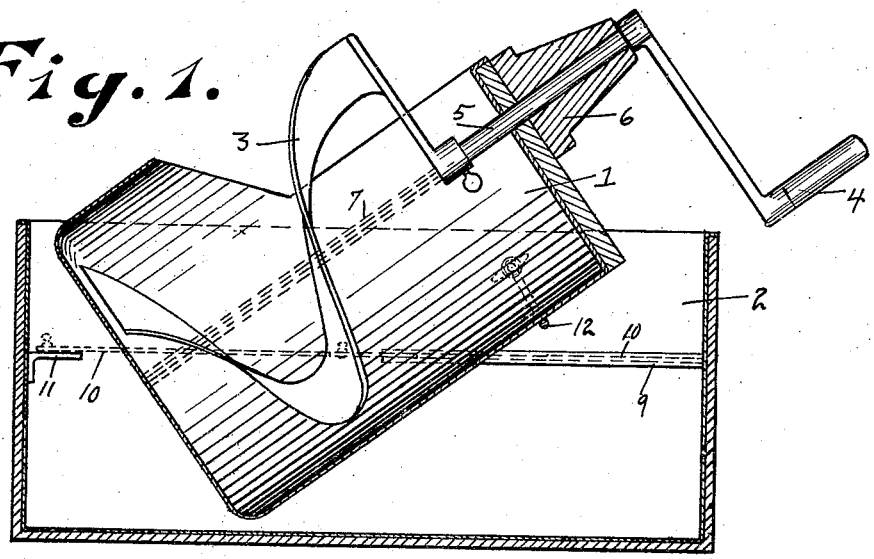
Figure 2:
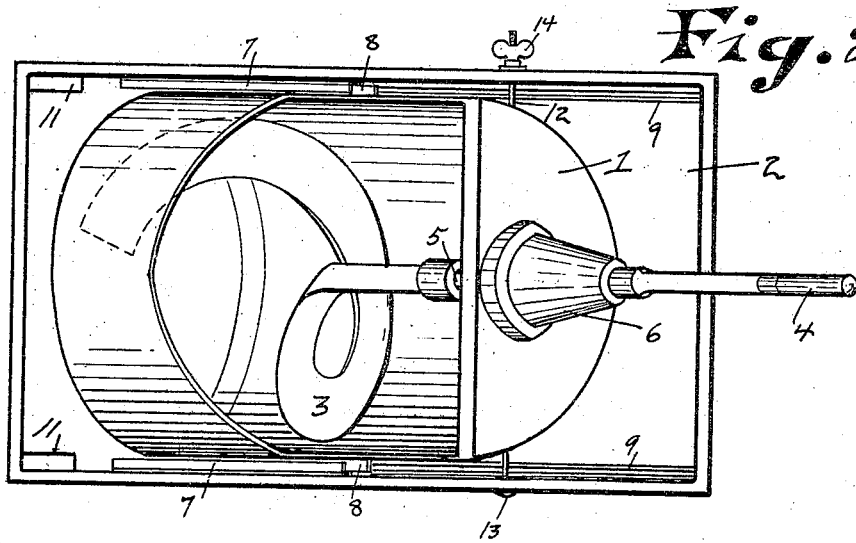
Figure 3:
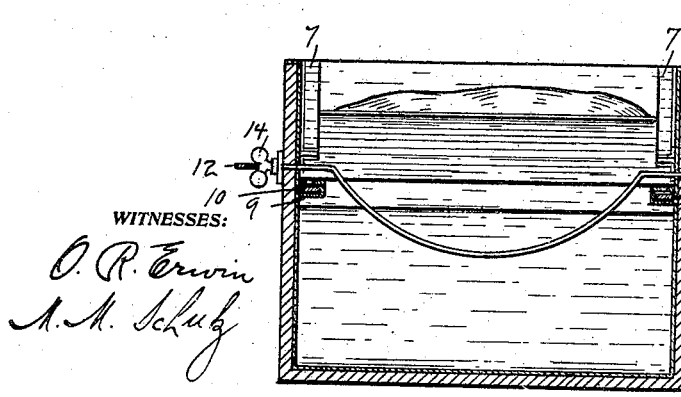

The construction of my invention is explained by reference to the accompanying drawings, in which, Figure 1 is a longitudinal vertical section of my device comprising the mixing receptacle and the supporting water tank. Fig. 2 is a top view of the device shown in Fig. 1, and Fig. 3 is a vertical transverse section of the water tank with the dough mixing receptacle removed.

Like parts are identified by the same reference characters throughout the several views.

1 is a dough receptacle which is rigidly supported in an inclined position within and by the inclosing water tank 2.

The mixing apparatus comprises the spiral blade 3, operating handle 4, and shaft 5, to which blade motion is communicated from said operating handle through said shaft. The shaft 5 is slidably supported from the tank 1 in the inclosing sleeve 6 in such a manner that the blade is free to move upwardly and downwardly in the receptacle 1 as it is being revolved in the dough, while owing to the fact that the shaft has a slidable movement in the supporting sleeve the operator is enabled to apply downward pressure upon the blade by pressing downwardly upon the operating handle. By releasing such pressure he can permit the blade to move upwardly. Thus the pressure of the blade upon the dough is completely under the control of the operator.

In the device shown in said previous patent the mixing receptacle was provided with a water receptacle at its lower end, whereby the temperature of the dough might be slightly regulated according to the temperature of the water placed in said chamber, but in view of the fact that the water chamber thus located was necessarily limited, I preferably support the dough receptacle 1 in an inclosing water tank 2 when the water in such tank is free to surround a larger area of the dough receptacle and a larger volume of water may be thus used, whereby a more uniform temperature is maintained.

A further object of my present improvement is to utilize the water tank as a means of maintaining the dough at the proper desired temperature after it has been kneaded and removed from the mixing receptacle, as hereinafter described.

The water tank 2 is provided on its respective sides with inclined guide flanges 7, 7, for the reception of the longitudinal supporting flanges 8 formed on their respective sides of the mixing receptacle, whereby said mixing receptacle is securely held in place in the water tank and prevented from turning by the action of the crank as the dough is being mixed.

As a further means of supporting and more rigidly securing the mixing receptacle in place, I provide the water tank with a supporting rod 12, which rod 12 is in turn supported at its respective ends from the respective side walls of the water tank 2, the central portion of said rod being curved downwardly to conform to the shape of the mixing receptacle, which rests thereon. Said rod 12 is provided at one end with a retaining head 13 and at its opposite end with a hand nut 14 operating on screw threaded bearings on the protruding end of said rod, whereby when said mixing receptacle is in place in said water tank, the respective sides of the tank may be drawn together by turning down said nut 14 upon said rod 12, whereby the supporting flange of the tank will be caused to impinge against the respective sides of the mixing receptacle upon the respective sides of the flange 8, whereby said mixing receptacle will be securely locked in place.

The water tank 2 is preferably formed of wood or other material which is a poor conductor of heat lined with sheet metal, whereby the water used in said tank will be longer retained at the desired temperature. The water tank is also provided on its respective sides with horizontal supporting flanges 9 in each of which are located slidable supporting bars 10.

It will be understood that when the mixing receptacle 1 is in place the slidable bars 10 are moved toward the right within the supporting flanges 9 and out of the way of the mixing receptacle. When, however, it is desirous to use the water tank for raising bread therein the sliding bars 10 are drawn out from the inclosing flanges 9 to the opposite end of the water tank when their free ends are supported upon the stationary bracket 11. When the mixing receptacle has been thus removed and the sliding bars 10 have been drawn out, as indicated, a plurality of loaves of bread with their inclosing pans may be placed upon the flanges 9 and sliding bar 10 above the water level therein and the water tank covered up with a cloth or in any other manner, when the bread thus supported will be retained at the required temperature by the water in said tank. Thus it will be obvious that the water tank serves the three-fold purpose of a means for supporting the mixing receptacle while it is being operated, and means of retaining the required quantity of water around the mixing receptacle for maintaining the dough therein at the desired temperature while being mixed, and also as a means of retaining the dough when mixed and removed from the kneading receptacle at the required temperature for raising the same.

Having thus described my invention what I claim as new and desire to secure by Letters Patent is,

1. The combination in a dough kneading apparatus of the class described comprising a mixing receptacle provided with two opposing sides with longitudinal supporting flanges, with a water tank inclosing said receptacle provided with inclined flanges formed for the reception of the flanges on said kneading receptacle, the flanges on said receptacle and inclosing tank being adapted to be interlocked together and hold said mixing receptacle rigidly in place in said water tank.

2. In a dough kneading apparatus of the class described the combination of a dough mixing receptacle provided with an elongated shaft supporting bearing, an operating shaft slidably supported in said bearing, and adapted to move upwardly and downwardly therein as the crank is being turned, a mixing blade secured to the lower end of said shaft, a water tank and means for removably supporting said mixing receptacle in an inclined position in said tank.

3. A dough kneading apparatus comprising a mixing receptacle, a mixing blade, an operating shaft and handle in combination with a water tank provided with means for rigidly holding said mixing receptacle when in place therein, and with inwardly projecting flanges adapted to be used for supporting bread pans above the water in said tank when said mixing receptacle is removed, all substantially as and for the purpose specified.

In testimony whereof I affix my signature in the presence of two witnesses.

JOHN KOELNER.

Witnesses:
JAS. B. ERWIN,
M. M. SCHULZ.